US008315278B2

(12) United States Patent
Junell (10) Patent No.: US 8,315,278 B2
(45) Date of Patent: Nov. 20, 2012

(54) NETWORK SYNCHRONIZATION METHOD

(75) Inventor: Jari Junell, Espoo (FI)

(73) Assignee: Nokia Corporation, Espoo (FI)

( * ) Notice: Subject to any disclaimer, the term of this patent is extended or adjusted under 35 U.S.C. 154(b) by 924 days.

(21) Appl. No.: 12/317,591

(22) Filed: Dec. 23, 2008

(65) Prior Publication Data

US 2010/0157972 A1   Jun. 24, 2010

(51) Int. Cl.
*H04J 3/06* (2006.01)
(52) U.S. Cl. ........................................ 370/503
(58) Field of Classification Search ........... 370/503–515
See application file for complete search history.

(56) References Cited

U.S. PATENT DOCUMENTS

| | | | |
|---|---|---|---|
| 6,639,905 B1 * | 10/2003 | Muller et al. ............ | 370/336 |
| 7,171,579 B2 * | 1/2007 | Weigl et al. .............. | 713/600 |
| 2004/0076186 A1 * | 4/2004 | Chen et al. ............... | 370/503 |
| 2005/0020275 A1 * | 1/2005 | Agrawala et al. ........ | 455/456.1 |
| 2005/0076186 A1 * | 4/2005 | Traut ......................... | 712/1 |
| 2005/0116834 A1 * | 6/2005 | Block et al. .............. | 340/825.21 |
| 2005/0141565 A1 * | 6/2005 | Forest et al. .............. | 370/503 |
| 2005/0169233 A1 | 8/2005 | Kandala et al. .......... | 370/349 |
| 2005/0185628 A1 | 8/2005 | Watanabe et al. ........ | 370/347 |
| 2008/0069072 A1 * | 3/2008 | Callaway et al. ......... | 370/342 |
| 2008/0123558 A1 * | 5/2008 | Chhabra .................... | 370/254 |
| 2008/0123597 A1 * | 5/2008 | Arbol et al. ............... | 370/331 |
| 2008/0130519 A1 * | 6/2008 | Bahl et al. ................. | 370/254 |
| 2008/0181154 A1 | 7/2008 | Sherman .................... | 370/311 |
| 2008/0253354 A1 * | 10/2008 | Eguchi ....................... | 370/350 |
| 2008/0273460 A1 * | 11/2008 | Lamothe et al. .......... | 370/231 |
| 2009/0010192 A1 * | 1/2009 | Huang et al. .............. | 370/311 |
| 2010/0220749 A1 * | 9/2010 | Colmant et al. .......... | 370/503 |

OTHER PUBLICATIONS

"IEEE Standard for Information technology—Telecommunications and information exchange between systems—Local and metropolitan area networks—Specific requirements—Part 11: Wireless LAN Medium Access Control (MAC) and Physical Layer (PHY) Specifications", IEEE Std 802.11™, 2007, 8 pgs.

* cited by examiner

*Primary Examiner* — Andrew Lai
*Assistant Examiner* — Juvena Loo
(74) *Attorney, Agent, or Firm* — Harrington & Smith (57) ABSTRACT

At least some exemplary embodiments of the invention enable a node to transmit synchronization information to other near-by nodes in a cognitive radio network during a transmission period. In one exemplary embodiment, an internal clock is compared to received synchronization information, a length of a next transmission period is set as a function of the comparing, and synchronization information is transmitted only once during the next transmission period.

13 Claims, 10 Drawing Sheets

NETWORK SYNCHRONIZATION METHOD

TECHNICAL FIELD

The exemplary and non-limiting embodiments of this invention relate generally to wireless communication systems, methods, devices and computer programs and, more specifically relate to nodes that are responsible for keeping synchronization among each other in a wireless local area network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

One problem in wireless ad hoc networks relates to the synchronization from node to node due to each node transmitting its synchronization message during its beacon period. During these beacon periods, other node's receivers have to be kept on. During a node's own beacon period, there may be a number of collisions in a dense multi-hop environment when multiple nodes attempt to send their own synchronization message.

The following abbreviations that may be found in the specification and/or drawing figures are defined as follows:

| | |
|---|---|
| CR | cognitive radio |
| State NRE | node ready |
| State NRX | node receiving |
| State NTX | node transmitting |
| Sub state BE | beacon (node is either transmitting or receiving depending on the node's state) |
| Sub state MI message | missed (node has not been able to receive the synchronization correctly) |
| Sub state NO | nothing (no synchronization message has been found) |
| Sub state RE | ready (the beacon period has finalized successfully) |
| Pupdate | period update (change the length of the next transmission period) |
| MiRxFR | missed frame (a running count of missed frames per transmission period) |
| TxPeriod | length of a transmission period |

In one mode of wireless local area network (WLAN) systems, the communicating nodes contend with one another for transmissions in the beacon period (e.g. 100 ms) regarding the sharing of network resources. This represents an ad hoc network since there is no hierarchy of nodes in which one node controls/allocates radio resources. Further, implementations of WLAN may suffer from an inability to be effectively scaled.

Significant research has been invested in the context of a cognitive radio network in response to this problem. Cognitive radio is also an ad hoc environment in which nodes opportunistically find spectrum holes which are not scheduled by a controlling entity. A considerable amount of effort in cognitive radio development has been directed to achieving non-interfering coexistence, such as with existing cellular wireless communication systems where they might find those spectrum holes. Scaling ad hoc networks for high densities of users remains a challenge.

As such, there is a need for techniques to scale ad hoc systems to high user densities, as for example in a case where there may be a large number of personal wireless devices with wireless connectivity. Such techniques should not impose a high power demand on those wireless nodes.

SUMMARY

The foregoing and other problems are overcome, and other advantages are realized, by the use of the exemplary embodiments of this invention.

In an exemplary embodiment of the invention there is provided a method that comprises comparing an internal clock to received synchronization information, setting a length of a next transmission period as a function of the comparing, and transmitting synchronization information only once during the next transmission period.

In another exemplary embodiment of the invention there is provided a memory storing a program of computer readable instructions. When executed by a processor, the instructions result in actions that comprise comparing an internal clock to received synchronization information, setting a length of a next transmission period as a function of the comparing, and restricting transmission of synchronization information only once during the next transmission period.

In still another exemplary embodiment of the invention there is provided an apparatus that comprises a processor that is configured to compare an internal clock to received synchronization information; to set a length of a next transmission period as a function of the comparing; and to restrict transmission of the apparatus' own synchronization information to only once during the next transmission period.

In yet another exemplary embodiment of the invention there is an apparatus which comprises means for comparing an internal clock to received synchronization information, means for setting a length of a next transmission period as a function of the comparing, and means for restricting transmission of the apparatus' own synchronization information to only once during the next transmission period.

DETAILED DESCRIPTION

Figure 1:
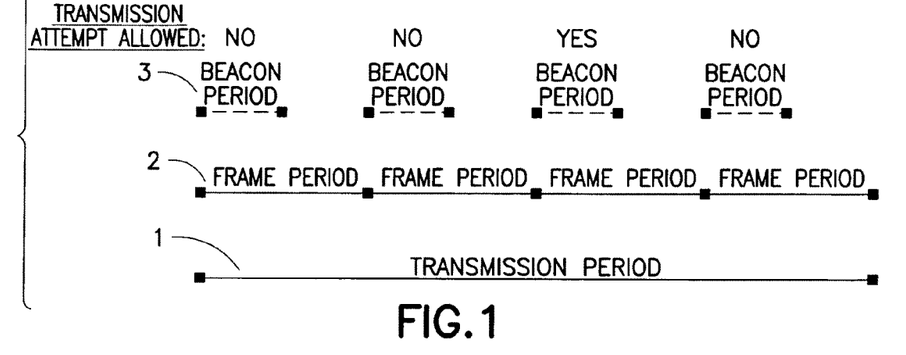
FIG. 1 is an exemplary timing diagram showing beacon periods, frame periods, and transmission period according to an exemplary embodiment of the invention.

The exemplary embodiments of this invention may be employed in a cognitive radio or other type of ad hoc network environment. There are nodes that are present in the network which submit synchronization signals to one another during a beacon period. On exemplary relationship between the beacon period, frame period and transmission period is shown in FIG. 1. The frame period is a basic time unit in a system, where network synchronization, control signaling and data transmission is done. Beacon period can vary from part of the frame period up to full frame period. During that time synchronization messages are allowed to be transmitted. A transmission period may encompass one frame period or multiple frame periods, and represents that time period during which a node in the ad hoc network is allowed only one attempt to transmit its own synchronization message The nodes in an ad hoc network are responsible for keeping the synchronization between each other since there is no fixed hierarchy such as a base station which would always set synchronization in more traditional cellular networks. Exemplary embodiments of this invention enable nodes in the ad hoc network to consume very low power while satisfying reasonable delay requirements during the exchange of this synchronization information with one another. Certain exemplary embodiments further provide high scalability with the node density, and an ability to accommodate outgoing and incoming nodes to the system.

Exemplary embodiments of this invention may be employed in the ad hoc operational mode of a wireless local area network (WLAN), or in a cognitive radio environment or in any other ad hoc radio networks. The exemplary terminology used herein reflects the WLAN system terms for explaining the inventive concept but this is by way of explanation and is not a limitation to the inventive concepts described; one network may use the term beacon period or frame period while the same concepts may be referred by different terms in another network.

Each node has an understanding of the start of the beacon period. When the nodes are in synchronization with one another, they have the same understanding of the start of the beacon period. During the beacon period, synchronization between the nodes occurs, and user data and control data are transmitted. The synchronization repeats in each beacon period, and the length of the beacon period could possibly be for example 100 ms. Each node attempts to transmit synchronization information to other nearby nodes, while attempting to avoid interfering with other nodes transmitting their own synchronization information. In addition, the various nodes adapt to the synchronization information they receive from whichever node has the fastest clock, according to an exemplary embodiment of the invention. For example, if a particular node receives synchronization information from another node and that received synchronization information has a slower clock than the receiving node's own clock, the receiving node will ignore the slower synchronization information that it received from the slower node.

As an overview, consider an exemplary embodiment in which a node with an internal clock that is slower than most of the clocks in the ad hoc network, and this slower-clock node is joining that network. Each node in the network transmits a synchronization message, and all nodes adjust their clock to the fastest node's clock time which they can receive and that is the local network time. Because of possibly multi hop network, not all the nodes can receive directly the network time, which has progressed most. Each node has its own internal clock, which increments its internal network time. The network time is therefore established based on the node having the fastest clock and so the network time progresses faster than the node with slower clock. When that slower-clock node receives the network time in a synchronization message, the network time of the received synchronization message is most likely ascended more than in the slower-clock receiving node. The slower-clock receiving node then takes the new network time from the received synchronization message. The internal clock of the joining node remains the same, and its network time starts to lag again from the network times of the fastest clock node. So always when that slower-clock node receives a faster propagated network time, it momentarily catches up the faster network time. The same holds true for all other nodes established on the network whose clock is slower than the fastest-node clock which is reflected in the received synchronization messages; they will lag to some degree from that network time, and momentarily catch up to the network time based on the synchronization messages they receive.

Certain exemplary embodiment of this invention reduce the node's power consumption and improves the node's clock accuracy during the beacon period, as compared to prior art ad hoc systems. From the individual node's perspective, exemplary embodiments of this invention also reduce the number of transmissions during the beacon period, increase the number of successful receptions, and decrease the number of unsuccessful receptions.

A desirable goal to accomplish the foregoing is to reduce the amount of time a node's transmitter is powered up (transmitter on-time). In this instance, each node has what we term its own transmission period. A node is allowed to attempt to transmit only once in its transmission period, and in an embodiment that transmission occurs in a randomly selected frame period, so the node's transmitter may be de-powered (reduced power state) during other frame periods of the transmission period. In an embodiment the node does not attempt to transmit its synchronization information if, during the beacon period of its transmit frame period, the node successfully receives the synchronization information or the node does not find any free time instant after some random delay that the node generates which is for the purpose of avoiding collisions before the end of beacon period.

In an embodiment, the length of this transmission period is dependent on the node's clock, the node's state after each beacon period, and any corrupted synchronization receptions that occur during the beacon period. In addition, the length of the next transmission period is updated after each current transmission period based on the information received during the current transmission period. Exemplary implementations favor the node with the fastest clock, which allows the nodes to transmit more often than if the synchronization were set to a node with a slower clock. In an embodiment, the possible synchronization transmissions are also adapted in a network according to the density of the nodes.

FIG. 1 illustrates how a transmission attempt for an individual node 10 is allowed. The node 10 is allowed only one attempt during a transmission period 3 to transmit its synchronization message. The transmission period 3 may span in an exemplary embodiment multiple frame periods 2 and multiple beacon periods 1 (in FIG. 1 there is one beacon period 3 in each frame period 2). In the FIG. 1 example, the top row of text indicates that this particular node is allowed to transmit only in the third beacon period 3 of the transmission period 1.

Figure 2A:
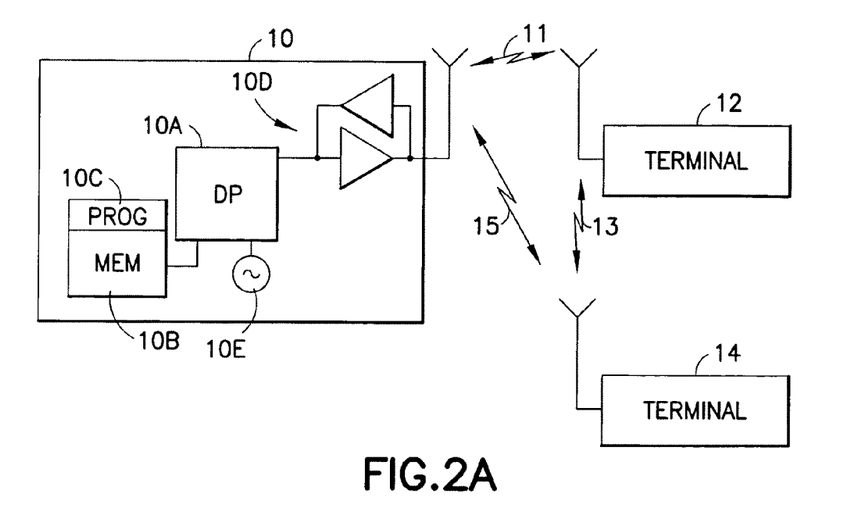
FIG. 2A is high level schematic block diagram showing a node communicating with two other nodes in an ad hoc network as an exemplary environment in which these teachings might be employed.

Before describing in further detail the exemplary embodiments of this invention, reference is made to FIG. 2A for illustrating a simplified block diagram of various electronic devices and apparatus that are suitable for use in practicing the exemplary embodiments of this invention. In FIG. 2A there is a wireless ad hoc network in which nodes 10, 12, 14 communicate over wireless links 11, 13, 15. An exemplary node 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications via one or more antennas. The node 10 has an internal clock 10E, shown as an oscillator, which may be a part of the DP 10A or may lie within one of the other processors shown at FIG. 2B.

The PROG 10C is assumed to include program instructions that, when executed by the associated DP 10A, enable the node/device to operate in accordance with the exemplary embodiments of this invention, as will be discussed below in greater detail.

That is, the exemplary embodiments of this invention may be implemented at least in part by computer software executable by the DP 10A or by hardware, or by a combination of software and hardware (and firmware).

In general, the various embodiments of the node 10 can include, but are not limited to, user equipment UE, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B may be of any type suitable to the local technical environment and may be implemented using any suitable data storage technology, such as semiconductor based memory devices, flash memory, magnetic memory devices and systems, optical memory devices and systems, fixed memory and removable memory. The DP 10A may be of any type suitable to the local technical environment, and may include one or more of general purpose computers, special purpose computers, microprocessors, digital signal processors (DSPs) and processors based on a multicore processor architecture, as non-limiting examples.

Figure 2B:
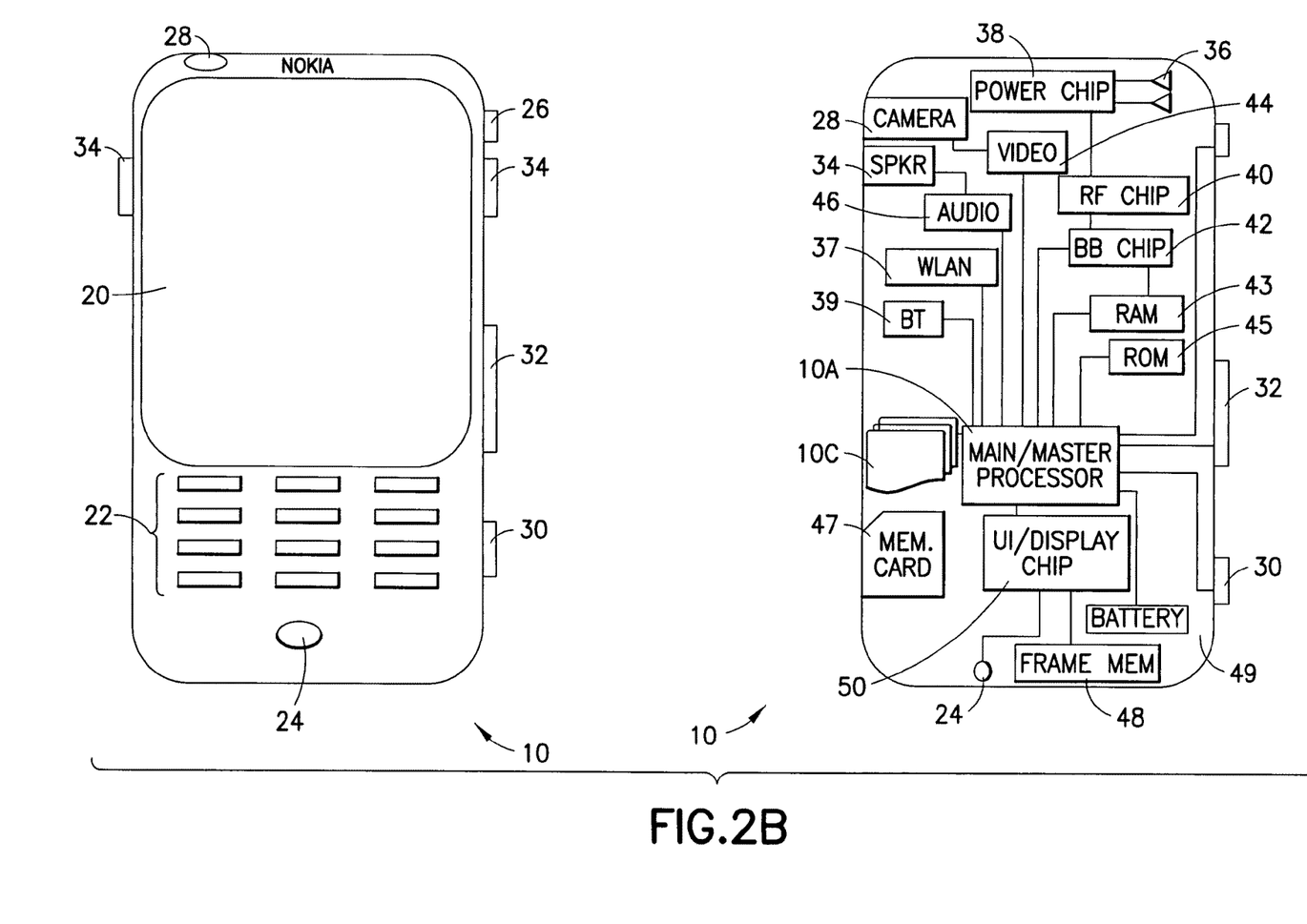
FIG. 2B is a schematic block diagram of a node from FIG. 2A showing further detail.

FIG. 2B illustrates further detail of an exemplary node 10 in both plan view (left) and sectional view (right), and the invention may be embodied in one or some combination of those more function-specific components. At FIG. 2B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 2B are seen multiple transmit/receive antennas 36 that are typically used for cellular communication. The antennas 36 may be multi-band for use with other radios in the node. The operable ground plane for the antennas 36 is shown by shading as spanning the entire space enclosed by the node housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and converts the signal for baseband processing. The baseband (BB) chip 42 detects the signal which is then converted to a bit-stream and finally decoded. Similar processing occurs in reverse for signals generated in the node 10 and transmitted from it.

Certain embodiments of the node 10 may also include one or more secondary radios such as an ad hoc wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47. The various programs 10C are stored in one or more of these memories. All of these components within the node 10 are normally powered by a portable power supply such as a battery 49.

The aforesaid processors 38, 40, 42, 44, 46, 50, if embodied as separate entities in a node 10, may operate in a slave relationship to the main processor 10A, which may then be in a master relationship to them. Any or all of these various processors of FIG. 2B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 2B.

Note that the various chips (e.g., 38, 40, 42, etc.) that were described above may be combined into a fewer number than described and, in a most compact case, may all be embodied physically within a single chip. The other nodes 12, 14 may be functionally similar to the node 10 of FIG. 2B but need not be.

Described now with respect to FIGS. 3-6 are various non-limiting methods for practicing the exemplary embodiments of this invention. Note that the names of the steps used in FIGS. 3-6 are provided only to facilitate an understanding of the invention, as the selected names provide enhanced clarity as to the overall purpose and functionality of the invention. As such, the particular names used in FIGS. 3-6 are not intended to be limiting in any respect as to how the exemplary embodiments of this invention are implemented in any particular instantiation thereof.

Figure 3:
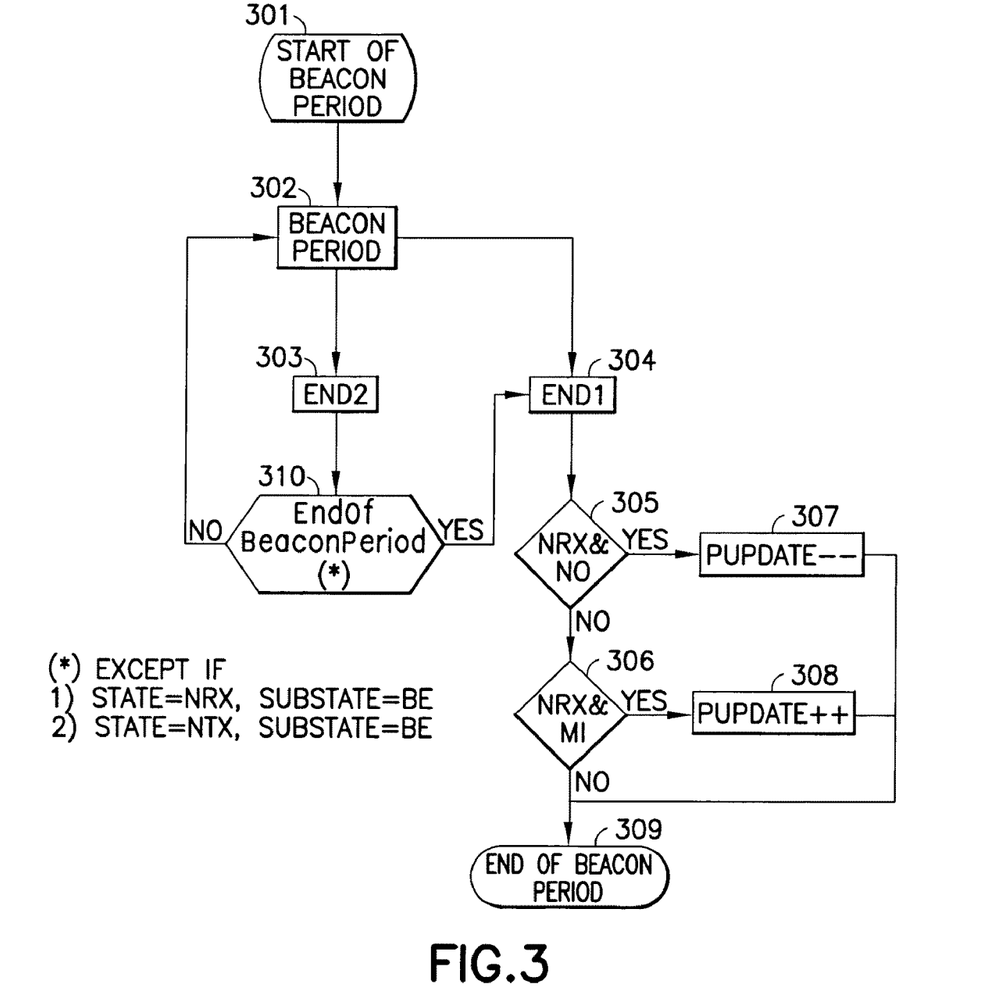
FIG. 3 is a process flow diagram illustrating the start or end of a beacon/synch period according to an exemplary embodiment of the invention.

FIG. 3 further shows the framework of the beacon period. The synchronization procedure can end either as a conditional end 303 or a direct end 304. When there is a conditional end 303, the beacon period state is checked. If the beacon period end has been reached (except in two special cases shown in figure) the conditional end is changed to a direct end 304 following the process related to that. However if there is still time left, the beacon period processing is continued. At the direct end 304 including the move from the conditional end2, the node 10 has either successfully received the synchronization message, transmitted the synchronization message or reached the end of beacon period. The sub-state of the node 10 is then looked at 305 and 306 to finalize the beacon period processing.

A variable known as the Period Update of the transmission period is then increased 308 or decreased 307 respectively if the following conditions apply. If the sub-state 305 indicates that the node 10 has not received a synchronization message during the beacon period from the transmitting node, and that it has not itself transmitted a synchronization message, then the period update 307 is decreased to get a shorter transmission period to enable more synchronization message transmissions. Afterward, the beacon period ends 309.

If the sub-state 305 does not indicate whether the node received or transmitted the synchronization message, then the sub-state 306 indicates that the node 10 has not successfully received a transmitted synchronization message nor has it itself transmitted a synchronization message. In this instance, there are many nodes nearby. As such, the period update 308 is increased to enable for a longer transmission period and less chance for a synchronization message transmission to take place. Then, the end of the beacon period 309 occurs. When the clock of the transmitting node is faster than the clock of the receiving node, the Period Update of the receiving node is increased for a longer transmission period to allow the node with faster clock to transmit more often in the local area. When the transmitting node's clock is slower than the receiving node's clock, the period update of the receiving node is decreased to have a shorter transmission period and again to enable faster clock to transmit more often in the local area (in this case the node, which was receiving).

Figure 4:
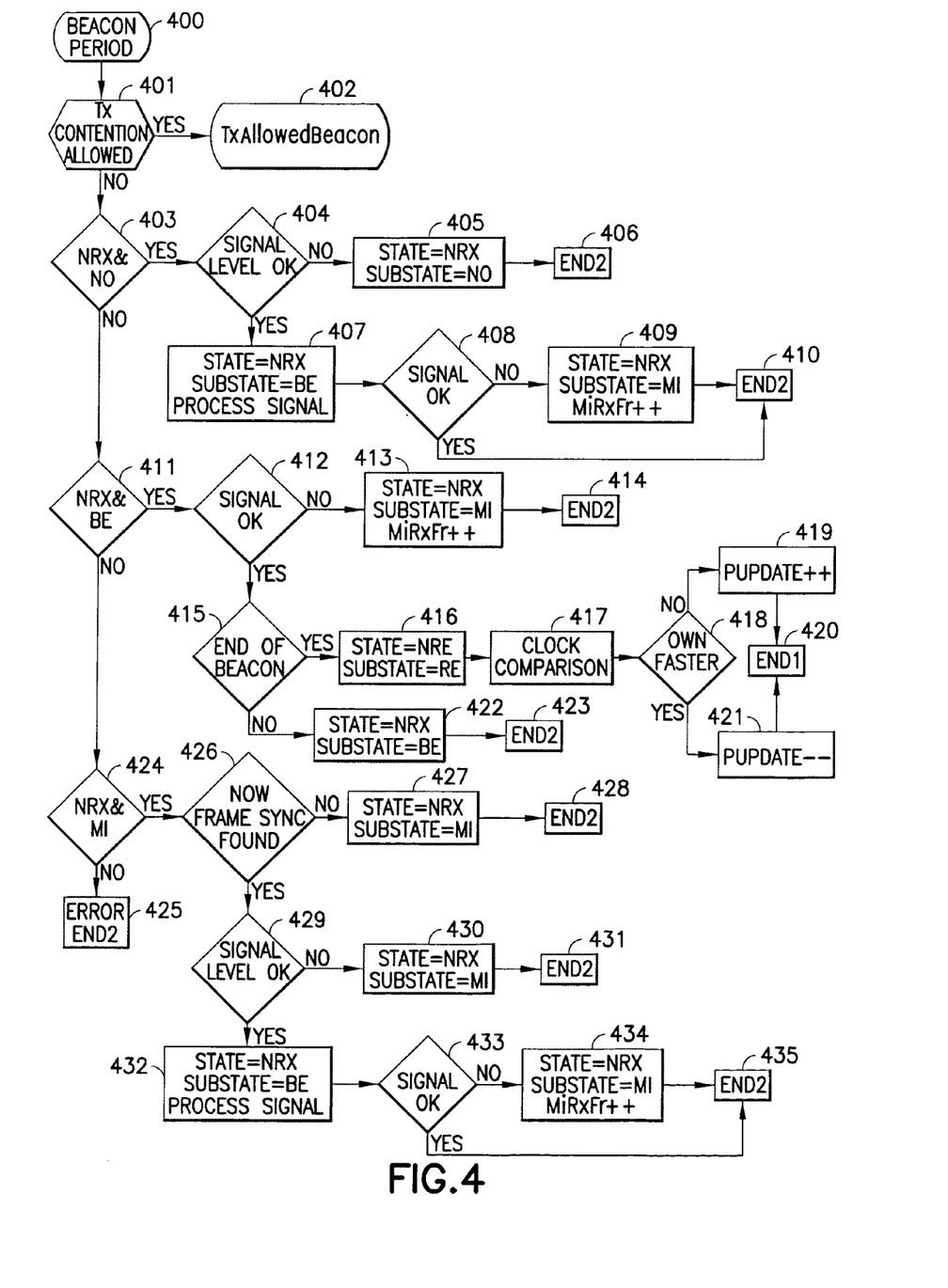
FIG. 4 is a process flow diagram illustrating behavior when the node is not allowed to transmit (state NRx) according to an exemplary embodiment of the invention.

FIG. 4 shows how the beacon period starts by investigating if the transmission contention is allowed to the node 10, where the node 10 is not allowed to transmit. If the transmission contention is not allowed, then the sub-state is checked to indicate whether the node 10 has received a synchronization message sent from another node. If the current sub-state is 403 indicating that no synchronization message has been found so far, the node 10 will check the received signal level 404. When under the threshold value, there is no change in the sub state and the conditional 406 is reached. If the signal level is okay (i.e. acceptable), then the sub-state 407 is changed to indicate that the node 10 is receiving the synchronization message and the processing of the signal started. If there is enough information to evaluate the signal content quality, a decision is made whether the signal content quality so far is acceptable 408. If the signal quality is acceptable, then a conditional end 410 is reached. If the signal quality is not acceptable, then the sub-state indicates that the node 10 has not been receiving the synchronization message correctly 409, and a parameter MiRxFr (Missed Frame) is incremented to indicate each time missed receptions. Then, a conditional end 406 is reached.

If the transmission contention is not allowed, and the current sub-state indicates that a synchronization message has been found 411, the sub-state can indicate that the node 10 is receiving the synchronization message. If the node 10 is in fact receiving a synchronization message, then the signal content quality can be evaluated at 412. If the signal content quality is not acceptable, then the node's sub-state indicates that it has missed the synchronization message and the missed frame counter is incremented, which indicates the missed receptions during the beacon period 413, after which the period reaches a conditional end 414.

If the signal quality is acceptable, then the synchronization message is tested 415. If the synchronization message has reached the end, then the node's sub-state indicates that the beacon period has been finalized successfully 416, and a comparison is made between the clocks of the transmitting and receiving node 417. If the transmitting node's clock is faster, then the period update counter of receiving node is incremented 421 to statistically enable better opportunity to spread faster clock information in the area. Then the beacon period reaches a direct end 420. If the transmitting node's clock is slower than the receiving node's clock, then the period update counter of receiving node is decremented 421 to have a shorter transmission period. Then the beacon period reaches a direct end 420. If the synchronization message 415 has not reached the end, then the node's sub-state indicates that it is still receiving a synchronization message 422, and the beacon period reaches a conditional end 423.

If the node's sub-state does not indicate that it is receiving a synchronization message 411, or that no synchronization message has been found 403, then it would indicate that the node 10 has not been able to receive the synchronization message 424 correctly in some occasion during the current beacon period. If node 10 has received the synchronization message, then the beacon period reaches a conditional end 425.

However, if the former is true, then a new synchronization message is sought out 426. If a new synchronization message cannot be found, 427, then the beacon period reaches a conditional end 428. On the other hand, if another synchronization message is found, the signal quality level is evaluated 429. If the signal content quality is not acceptable, then the node's sub-state indicates that it has not been able to receive the synchronization message 430, and the beacon period reaches a conditional end 431. If the signal content quality is acceptable, then the node's sub state indicates that it is receiving a synchronization message, and the signal is processed. At this point 432, if the signal quality is acceptable 433, the beacon period is at a conditional end 435. However, if the signal quality is not acceptable, then the sub-state indicates the synchronization message was not received and the missed frame variable is incremented 434 to indicate the missed reception. Then, the period reaches a conditional end 435.

Figure 5:
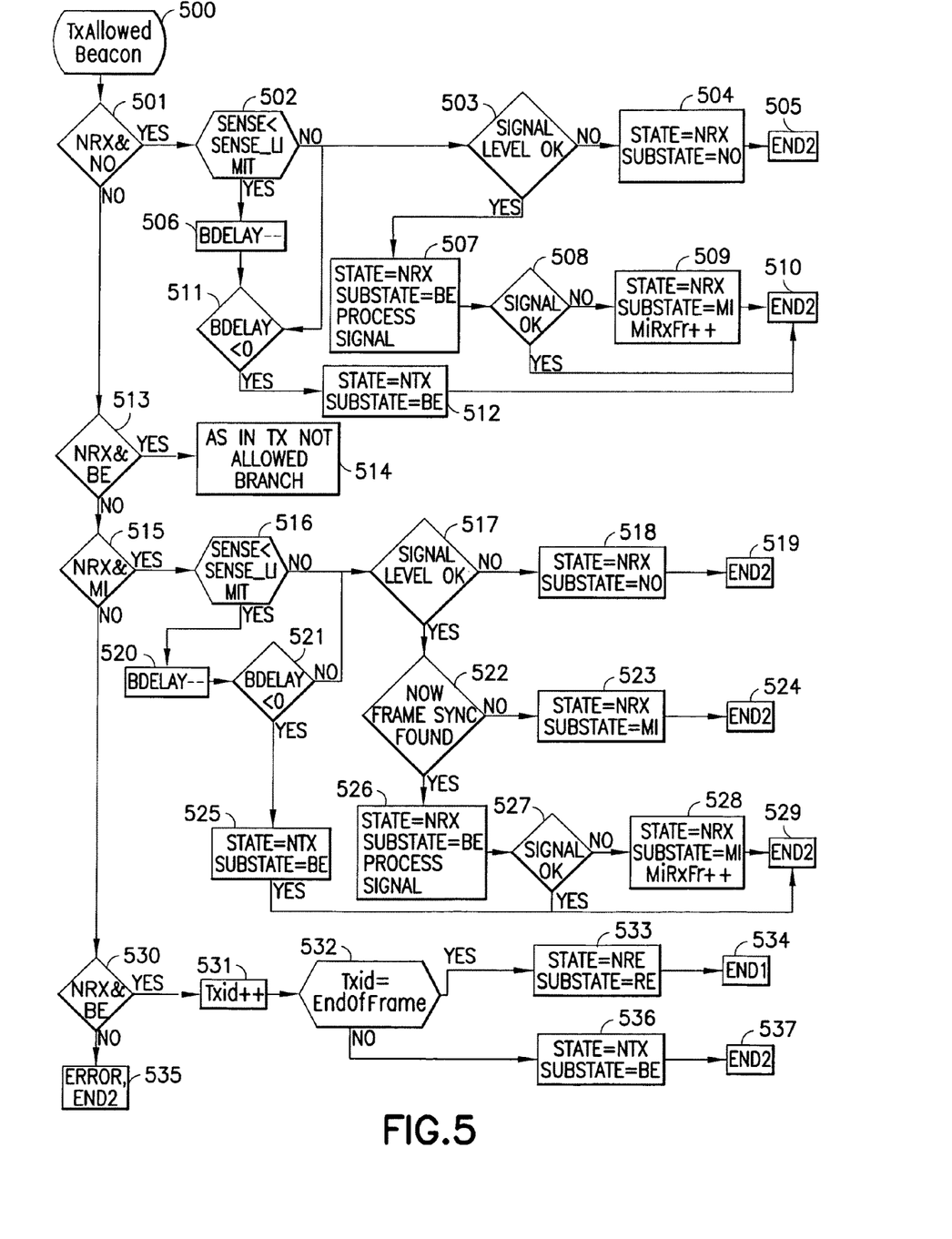
FIG. 5 is a process flow diagram illustrating behavior when the node is allowed to transmit (State NTx) according to an exemplary embodiment of the invention.

FIG. 5 illustrates when beacon transmission contention is allowed to the node 10, where the node 10 is allowed to transmit the synchronization message. If the sub-state indicates that no synchronization message has been found 501 so far, then the sense level at which the synchronization message should be detected is compared 502 to the present received signal level of the node 10. If the received signal level is more than the sense limit that should ensure detection of the synchronization message, then the signal level for decoding is evaluated 503. If the signal level for decoding is not acceptable, 504, then the period reaches a conditional end 505. If the signal level for decoding is acceptable, then the node's sub-state is changed to indicate that it is receiving a synchronization message, and the node's signal is processed 507. Here, if the signal quality is then found to be acceptable 508, then the beacon period ends 510. If the processed signal is not acceptable, then the node's sub-state indicates that the synchronization message was missed and missed frame variable is incremented to indicate the missed reception 509. Then, the beacon period ends 510.

If the sense level 502 is less than the limit that would ensure proper detection, then it is assumed, that the radio channel is empty and the countdown of the generated random delay before the start of frame period is started. Each node, which has the permission to try transmission in this frame period has generated its own random delay value to avoid collisions in the transmission. After decrementing the random delay, the node check the value of it 511. If the random delay has not reached the zero, then it has not permission to send and it goes to signal level comparison 503 explained above. However if the random delay has reached the zero, then the node starts the transmission of the synchronization message 512.

If transmission contention is allowed to the node 10, and the node's sub-state indicates that it is receiving a synchronization message 513, then the node 10 will undergo the same process as previously starting from 411 as if transmission contention to the node 10 was not allowed 514.

If the sub-state indicates that the synchronization message was not received correctly 515, then the received signal level is compared with the sense limit that would ensure the channel to be free of any signal 516. If the received signal level is not less than the sense limit that would ensure the channel to be free, then the signal level is evaluated 517. If the signal level is not acceptable for decoding, then the sub-state indicates that no synchronization message is found 518, and the beacon period ends 519.

If the signal level is acceptable for decoding, then a new synchronization message is attempted to be found 522. If a new synchronization message is not found, 523, then the beacon period ends 524.

If a new synchronization message is found, then node's sub-state indicates reception of a synchronization message, and the signal is then processed 526. Afterward, if the signal content quality is evaluated to be acceptable 527, then the beacon period ends conditionally 529.

In contrast, if the signal content quality is determined to not be acceptable, then the sub-state and missed frame parameter indicates a missed synchronization message 528, and the beacon period ends 529.

If the received signal level 516 is less than the sense limit mentioned before, then it is assumed, that the radio channel is empty and the countdown of the generated random delay before the start of frame period is started. After decrementing the random delay, the node check the value of it 520. If the random delay has not reached the zero 521, then it has not permission to send and it goes to signal level comparison 517 explained above. However if the random delay has reached the zero, then the node starts the transmission of the synchronization message 525.

If the node 10 is in a transmission state, then the state and sub-state indicate that the node 10 is transmitting a synchronization message 530. If the node 10 is not transmitting a synchronization message, then the beacon period reaches a conditional end 535. If the node 10 is indeed transmitting a synchronization message, then the synchronization message counter is incremented 531. If the end of the frame has been reached 532, then the node's state indicates that it is ready, while its sub-state indicates that the beacon period has finalized successfully 533. Then, the beacon period reaches a direct end 534.

If the end of the synchronization message is not reached 532, then the node's state and sub-state indicates that it is transmitting still a synchronization message 536, after which the beacon period reaches a conditional end 537.

When the transmission period of the node 10 has been completed, the results collected are used to calculate a new value to the transmission period parameter. The two parameters that are used to update the new value are the period update and missed frame parameters. The period update indicates the final result of each beacon period. The missed frame parameter is incremented every time the node's sub-state indicates that a synchronization message reception was started, but then missed because of e.g. interference. As mentioned before, it indicates how many missed receptions there were cumulatively during the beacon periods within one transmission period. Both parameters can be used to calculate a maximum transmission period value or a variable transmission period value.

One way to calculate a maximum transmission period value is by only using the period update parameter. The period update can be added to the old transmission period value. If the result is less than 1, then the new transmission period value is 1. If the result is greater than 1, then the new transmission period value is the sum of the period update and old transmission period value. The disadvantages to this method are that it may not take into account the traffic load that occurs during the beacon period. On the other hand, every node in the network will be able to attempt to transmit or receive a synchronization message transmission within a reasonable time.

Another method is to add the values of the period update, missed frame and the old transmission period value. If the result is less than 1, the new transmission period value is 1. If the result is greater than 1, the new transmission period value is the newly calculated result. However, this approach can be problematic in very dense networks, if there is an upper limit for the transmission period. It may not enable every node to transmit a synchronization message transmission within a reasonable time.

Yet another method is to add the period update with the missed frame and then multiply the sum with a constant "a" less than one, and then add to calculated value 1 and finally multiply the result by the old transmission period value. If the result is less than 1, then the new transmission period value is 1. If the total value is greater than 1, then the new transmission period value is the newly calculated value rounded to integer value. This method changes the transmission period value more gracefully than others and the change rate can be controlled by the constant "a".

There can also now be a maximum transmission period value defined separately from the actually used transmission period value or where there is no defined maximum transmission period value.

Figure 6:
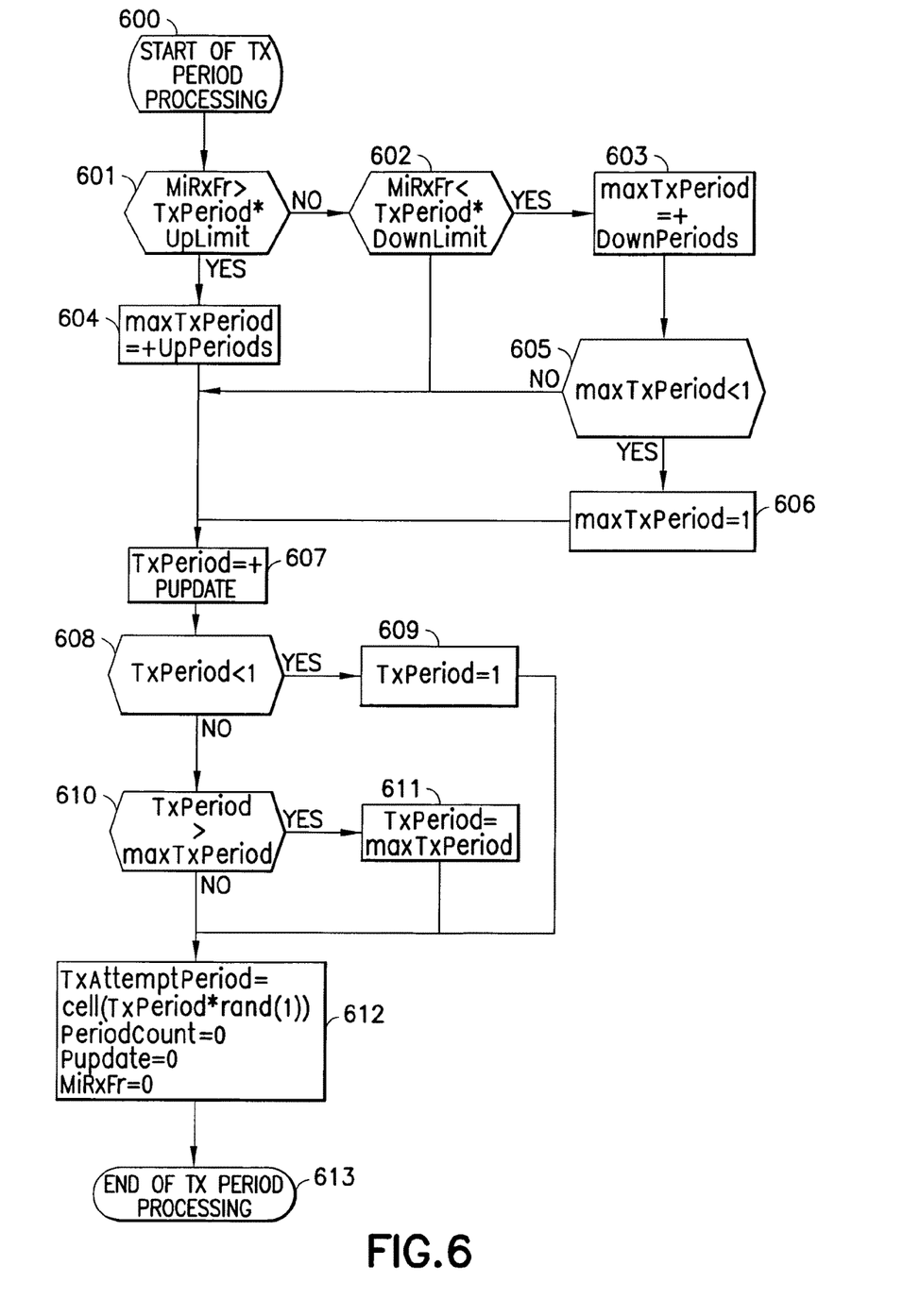
FIG. 6 is a process flow diagram illustrating adjusting a length of a node's transmission period according to an exemplary embodiment of the invention.

The last alternative to define a new transmission period adapts also the maximum value for the transmission period, FIG. 6. In FIG. 6, the start of the processing of the transmission period begins 600. Then a determination is made if the cumulative missed frame parameter during the transmission period is greater than the defined upper limit for the transmission period (e.g. 0.5 missed frames per beacon period) 601. If the missed frame is not greater than the upper limit, a determination is made if it is less than the lower limit defined for the transmission period (e.g. 0.1 missed frames per beacon period) 602. If the missed frame value is indeed less than the lower limit, then the maximum transmission period is decreased by a down period 603. Then, a determination is made if the maximum transmission period is less than one 605. If maximum transmission period is less than one, then the value of the maximum transmission period is corrected equal to one 606. If the maximum transmission period is not less than one, then the period update is incremented 607.

If the missed frame value is greater than the upper limit 607, then the maximum transmission period is increased by a constant known as an up period. Afterward, the period update is incremented 607. At this point a determination is made if the transmission period is less than one 608. If the transmission period is less than one, then the value of the transmission period is corrected to equal one 609. Then the beacon period, where the synchronization message transmission attempt is allowed, is calculated in a random fashion. The period count, period update, and missed frame are corrected to zero for the next transmission period 612. Then the processing period ends 613.

If the transmission period 608 is not less than 1, then a determination is made if the transmission period is greater than the maximum transmission period 610. If the transmission period is greater than the maximum period, then it is corrected to equal the maximum period 611, else the new calculated value for transmission period is valid. Then the beacon period, where the synchronization message transmission attempt is allowed, is calculated in a random fashion 612, and the processing period ends 613.

Block 612 is valid after each method presented to calculate the new transmission period value. It is initialization for the next transmission period.

One of the advantages that is obtained by the use of the exemplary embodiments of this invention is that the number of transmitters that have to be on during each beacon period is reduced dramatically. This enables a considerable savings in operating power (e.g., in battery power). The clock accuracy of the nodes is also improved as well because faster clocks are dominating more and all nodes are approaching the time base of faster clocks. Altogether the number of transmissions made during the beacon period is significantly reduced, while the number of successful receptions of the synchronization information is increased. As such, the number of missed/erroneous receptions is reduced.

Figure 7:
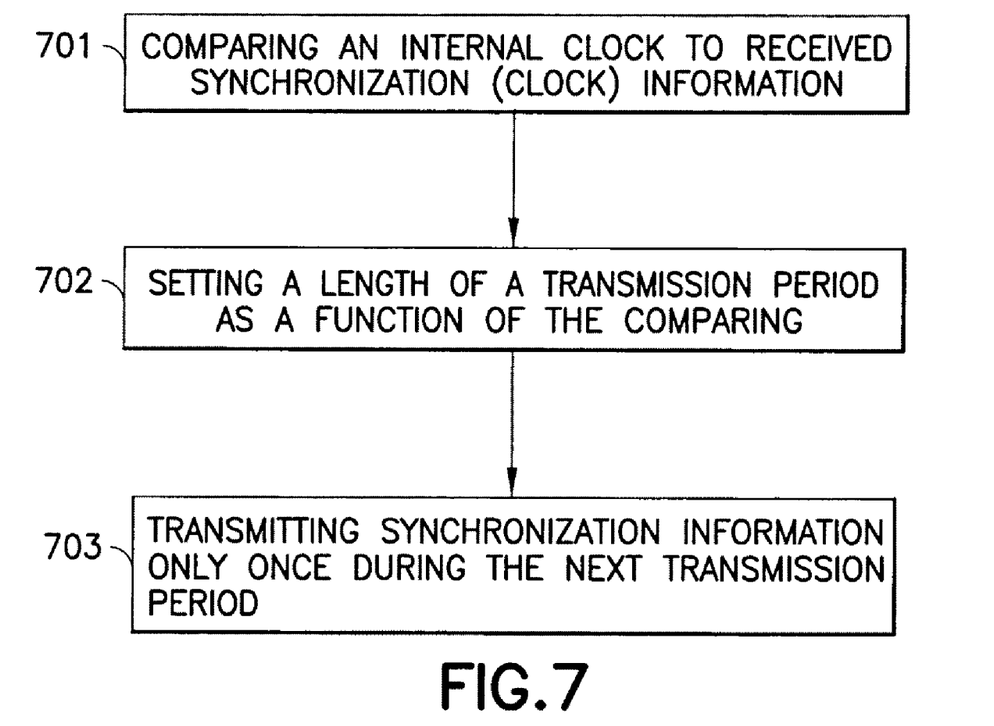
FIG. 7 is a high level process flow diagram illustrating operation of a node for setting length of its transmission period according to an exemplary embodiment of the invention.

Reference is now made to FIG. 7 for showing in a logic flow diagram a possible embodiment of steps for implementing the synchronization procedure shown in FIGS. 3-6.

At block 701 an internal clock is compared to received synchronization information. At block 702 the length of the transmission period is set as a function of the comparison of the internal clock and received synchronization information. At block 703 the node's own synchronization information is transmitted only once during the transmission period.

The various blocks shown in FIG. 7 may be view as method and/or as operations that result from operation of computer program code. Furthermore, certain ones of the various steps may be executed, and additional steps that include greater may be included if desired.

A simulation of a beacon period based on the following parameters is illustrated below. The parameters shown below are merely examples and are not intended to be limiting in any way to the exemplary embodiments of this invention.

Simulation Result Example

| SYNC scheme (up and down with 0.5 and 0.1 TXperiod) | |
|---|---|
| # of nodes: | 400 |
| Boxsize: | 600 |
| Alpha: | 2.55 |
| Effective TX distance | 170 m |
| Effective sensing distance | 58 m |
| # of frames: | 400 (0.1 s per frame) |
| Max speed: | 2.0 |
| Sense_limit: | −76 dBm |
| SINR_limit: | 2 |
| PeriodTX | 5 |
| MaxPeriodTX new | |
| Results: | |
| Max clock error: | 2.125565e−005 |
| Min clock error: | 0 |
| Standard deviation of error: | 5.934135e−006 |
| Mean clock error: | 7.695999e−006 |

-continued

| SYNC scheme (up and down with 0.5 and 0.1 TXperiod) | |
|---|---|
| # of transmissions: | 6143 |
| # of successful receptions: | 130805 |
| # of missed receptions: | 77040 |

FIGS. 8-11 illustrate the results of the simulation and the various distributions of the clock errors of the nodes, the location of the nodes in box, the location of the clock errors in the box, and the distribution of the transmission attempt periods.

Figure 8:
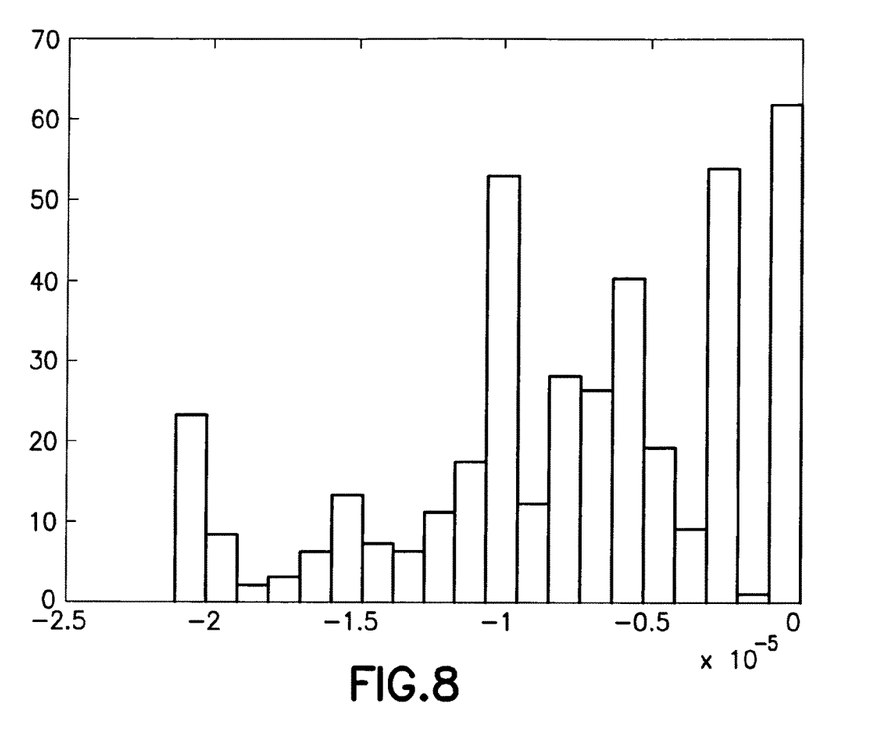
FIG. 8 is a bar chart illustrating the distribution of the clock errors of the nodes at the end of a simulation.
Figure 9:
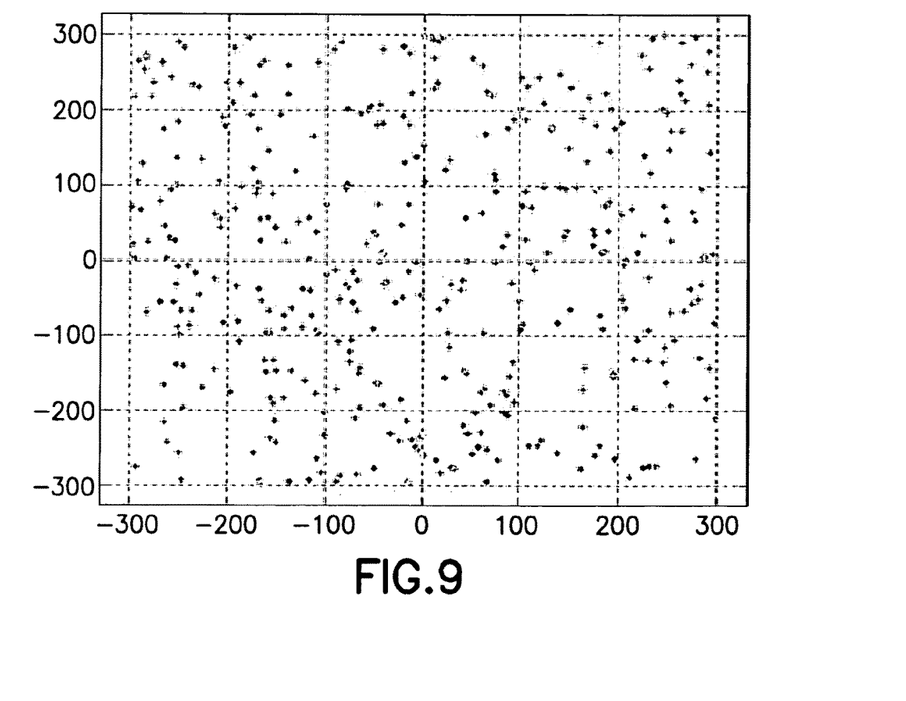
FIG. 9 is a scatter diagram illustrating node locations.
Figure 10:
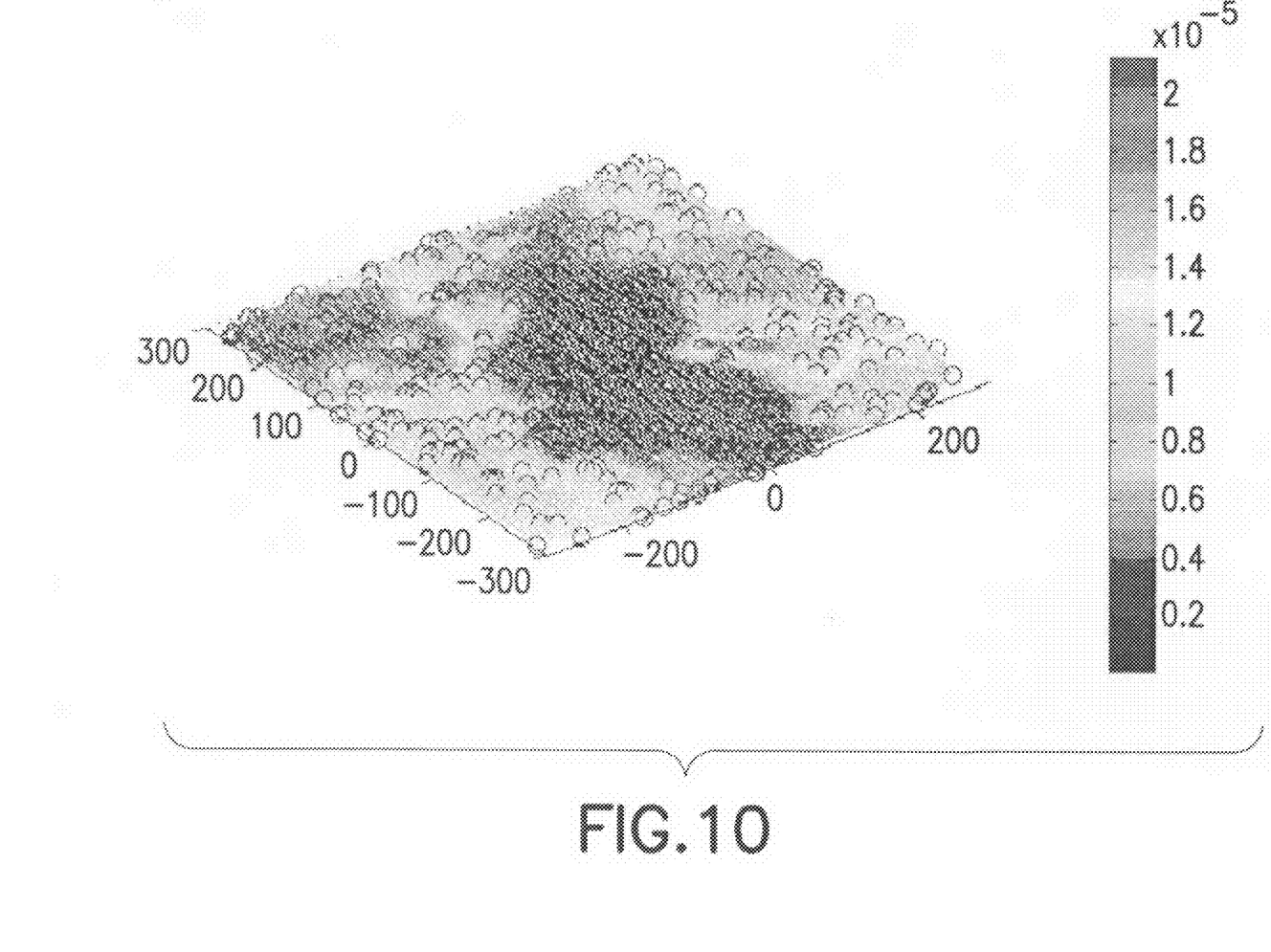
FIG. 10 is a scatter diagram illustrating clock error locations.
Figure 11:
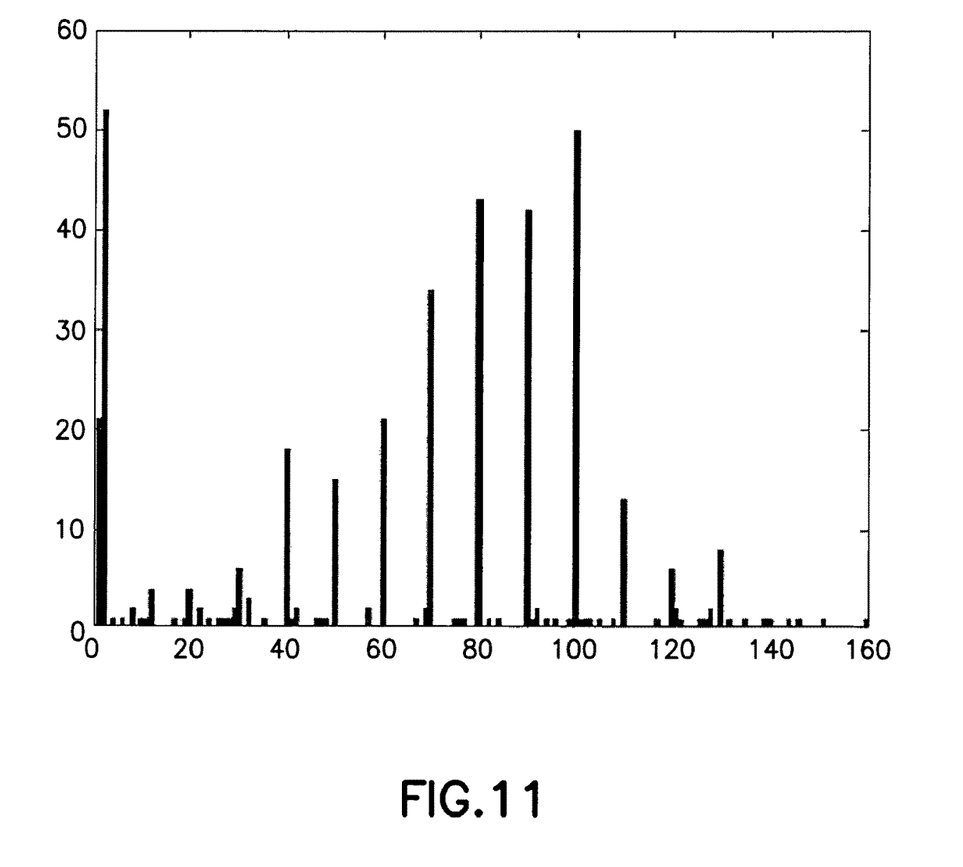
FIG. 11 is a bar chart illustrating distribution of transmit attempt periods.

More specifically, FIG. 8 illustrates how the clock errors of the nodes are distributed at the end of the simulation, FIG. 9 illustrates the locations of the nodes in the box, FIG. 10 illustrates the clock error locations of the nodes in the box; and FIG. 11 illustrates the distribution of the transmission attempt periods of the nodes.

In general, the various exemplary embodiments may be implemented in hardware, software, logic or a combination thereof. While various aspects of the exemplary embodiments may be illustrated and described as block diagrams, flow charts, or using some other pictorial representation, it is well understood that these blocks, apparatus, systems, techniques or methods described herein may be implemented in, as non-limiting examples, hardware, software, firmware, or other computing devices, or some combination thereof.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

As a further example, the exemplary embodiments have been described at least partially in the context of WLAN systems. It should be appreciated that the exemplary embodiments of this invention are not limited for use with only this one particular type of wireless communication system, and that they may be used to advantage in other wireless communication systems.

Further, the various names used for the described parameters (e.g., period update, missed frame) are not intended to be limiting in any respect, as these parameters may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    comparing at a first node an internal clock of the first node to synchronization information received from a second node;
    adapting the first node to the received synchronization information only when the received synchronization information indicates that the second node has a faster internal clock than the internal clock of the first node;
    setting a length of a next transmission period as a function of the comparing, and
    transmitting synchronization information only once during the next transmission period;

wherein the length of the next transmission period is a function of the comparing and a number of corrupted receptions of synchronization information;

wherein the length of the next transmission period is changed if, after a beacon period being in a reception state, the received synchronization information was not received or the received synchronization information was not correctly received;

wherein the length of the next transmission period is shortened when the received synchronization information indicates that the second node has a slower internal clock than the internal clock of the first node; and wherein the length of the next transmission period is lengthened when the received synchronization information indicates that the second node has a faster internal clock than the internal clock of the first node.

2. The method according to claim 1 wherein during a first transmission period in which the received synchronization information is received, the number of corrupted receptions of synchronization information is incremented each time a synchronization information of adequate signal quality is improperly received.

3. The method according to claim 1, where the transmitted synchronization information is transmitted in a random one of multiple beacon periods within the next transmission period.

4. The method according to claim 1, executed by the first node operating in an ad hoc network, in which transmitting the synchronization information is within a beacon period of the next transmission period in which the first node is allowed to attempt the transmission.

5. The method according to claim 1, further comprising, prior to the comparing, searching for the received synchronization information in multiple beacon periods within a first transmission period, each beacon period terminating at one of: a direct end in which the synchronization information is successfully received; and a conditional end in which the synchronization information is not successfully received.

6. A memory storing a program of computer readable instructions that when executed by a processor result in actions that comprise:

comparing at a first node an internal clock of the first node to synchronization information received from a second node, adapting the first node to the received synchronization information only when the received synchronization information indicates that the second node has a faster internal clock than the internal clock of the first node, setting a length of a next transmission period as a function of the comparing, and restricting transmission of synchronization information only once during the next transmission period;

wherein the length of the next transmission period is a function of the comparing and a number of corrupted receptions of synchronization information;

wherein the length of the next transmission period is changed if, after a beacon period being in a reception state, the received synchronization information was not received or the received synchronization information was not correctly received;

wherein the length of the next transmission period is shortened when the received synchronization information indicates that the second node has a slower internal clock than the internal clock of the first node; and wherein the length of the next transmission period is lengthened when the received synchronization information indicates that the second node has a faster internal clock than the internal clock of the first node.

7. The memory according to claim 6, where the length of the next transmission period is a function of the comparing and a number of corrupted synchronization receptions.

8. An apparatus comprising a processor configured to:

compare at a first node an internal clock of the first node to synchronization information received from a second node;

adapt the first node to the received synchronization information only when the received synchronization information indicates that the second node has a faster internal clock than the internal clock of the first node;

set a length of a next transmission period as a function of the comparison, and restrict transmission of the apparatus' own synchronization information to only once during the next transmission period;

wherein the length of the next transmission period is a function of the comparing and a number of corrupted receptions of synchronization information;

wherein the length of the next transmission period is changed if, after a beacon period being in a reception state, the received synchronization information was not received or the received synchronization information was not correctly received; and wherein the processor is configured to shorten the length of the next transmission period when the received synchronization information indicates that the second node has a slower internal clock than the internal clock of the first node, and to lengthen the length of the next transmission period when the received synchronization information indicates that the second node has a faster internal clock than the internal clock of the first node.

9. The apparatus according to claim 8, wherein the processor is further configured to increment the number of corrupted receptions of synchronization information each time a synchronization information of adequate signal quality is improperly received during a first transmission period in which the received synchronization information is received.

10. The apparatus according to claim 8, further comprising a transmitter configured to transmit the apparatus' own synchronization information in a random one of multiple beacon periods within the next transmission period.

11. The apparatus according to claim 8, wherein the apparatus comprises the first node configured to operate in an ad hoc network, the first node further comprising a transmitter configured to transmit the apparatus' own synchronization information within a beacon period of the next transmission period in which the first node is allowed to attempt the transmission.

12. The apparatus according to claim 8, further comprising a receiver configured to search for the received synchronization information in multiple beacon periods within a first transmission period, and the processor is configured to terminate each of the beacon periods at one of: a direct end in which the synchronization information is successfully received; and a conditional end in which the synchronization information is not successfully received.

13. An apparatus comprising at least one processor and at least one memory including computer program code, the at least one memory and computer program code configured, with the at least one processor, to cause the apparatus to perform at least the following:

comparing at a first node an internal clock of the first node to synchronization information received from a second node, adapting the first node to the received synchronization information only when the received synchronization information indicates that the second node has a faster internal clock than the internal clock of the first node, setting a length of a next transmission period as a function of the comparing, and restricting transmitting the apparatus' own synchronization information to only once during the transmission period;

wherein the length of the next transmission period is a function of the comparing and a number of corrupted receptions of synchronization information;

wherein the length of the next transmission period is changed if, after a beacon period being in a reception state, the received synchronization information was not received or the received synchronization information was not correctly received; and wherein the at least one processor is configured to shorten the length of the next transmission period when the received synchronization information indicates that the second node has a slower internal clock than the internal clock of the first node, and to lengthen the length of the next transmission period when the received synchronization information indicates that the second node has a faster internal clock than the internal clock of the first node.

* * * * *